United States Patent [19]

Dokken

[11] Patent Number: 5,706,762
[45] Date of Patent: Jan. 13, 1998

[54] RETRIEVING DEVICE FOR TRAINING DOGS

[76] Inventor: Thomas Dokken, 4186 W. 85th St., Northfield, Minn. 55057

[21] Appl. No.: 576,633

[22] Filed: Dec. 21, 1995

[51] Int. Cl.$^6$ ............................................. A01K 37/00
[52] U.S. Cl. ................ 119/712; 119/905; 119/707; D30/160
[58] Field of Search ................... 119/707, 708, 119/709, 710, 711, 712, 814, 821, 905; D30/160, 199; D21/62, 63, 148; 446/369, 320

[56] References Cited

U.S. PATENT DOCUMENTS

| | | | |
|---|---|---|---|
| 745,806 | 12/1903 | Erb . | |
| 1,325,651 | 12/1919 | Pajeau | D21/62 |
| 2,282,179 | 5/1942 | Fisher | D21/62 |
| 2,448,088 | 8/1948 | Driggs | 446/320 |
| 3,333,360 | 8/1967 | Hardy | 446/369 |
| 3,354,578 | 11/1967 | Ryan | 446/369 |
| 3,460,286 | 8/1969 | Danberg | 446/369 |
| 3,785,643 | 1/1974 | Rich | D21/62 |
| 4,565,376 | 1/1986 | Croll | 446/369 |
| 5,038,717 | 8/1991 | Bent . | |

OTHER PUBLICATIONS

Scott's Dog Supply 1991/1992 catalog (p. 14–Items 3592 TDY and 3593 TDY).
Scott's Dog Supply 1991/1992 catalog (p. 14–Item 3595 KDY).
"PlastiDuk" product brochure of Plasti-Products, Klamath Falls, OR.

*Primary Examiner*—Mark Polutta
*Attorney, Agent, or Firm*—Fredrikson & Byron, P.A.

[57] ABSTRACT

A training device in the form of a retrieving dummy having a life-like appearance and texture. The device is durable in the course of repeated, rigorous, and demanding use, and is configured to encourage and train the dog to grasp the device in the proper manner, i.e., by the body portion and away from the head, feet or tail of the bird.

12 Claims, 4 Drawing Sheets

5,706,762

RETRIEVING DEVICE FOR TRAINING DOGS

TECHNICAL FIELD

The present invention relates to animal training devices, and in particular to devices such as retrieving dummies for use in training dogs to retrieve downed waterfowl on land and water.

BACKGROUND OF THE INVENTION

Dogs have long been trained and used for retrieving downed waterfowl. For perhaps an equally long time it has been the practice to train dogs for such purposes by having the dogs repeatedly retrieve thrown objects such as sticks. The dog must learn a number of skills, including when and how to approach the waterfowl and return it to the trainer or hunter. They should also, however, learn how to best to grasp the waterfowl in order to minimize further damage to the skin or tissues of the downed bird. Simple retrieving dummies, such as sticks, are of little use in this respect.

Present day techniques for training retrieving dogs generally involve the use of home-made or commercially supplied retrieving dummies. As with sticks, such dummies are of little help in training the dog how best to grasp the downed bird.

U.S. Pat. Nos. 745,806 (Erb) and 5,038,717 (Bent), for instance, describe devices for use in training dogs. Erb describes a retrieving device having a mouthpiece and legs supporting the mouthpiece above the ground. Bent, in contrast, describes an adjustable halter that fits about the dog's head, which can be attached to a training dummy and used to keep the dog's head down.

Examples of commercially available devices include those identified at page 14 of Scott's Dog Supply 1991/1992 catalog. Certain devices (Items 3592 TDY and 3593 TDY) are pictured and described as "easy throwing". They are also described as being made of a "closed cell foam" with a durable nylon cover, and as having a floating rope that pulls out from either end. The orange rope is said to help the trainer find the dummy in grass or snow. Also in this catalog, and on the same page, is shown a "plastic knobby dummy" (Item 3595 KDY) made of heavy duty vinyl and provided in either white or orange. Each device, however, is generally rod-like in shape, and bears little resemblance to a real bird.

Another device presently on the market is the "Ded-Duk Dog Trainer" shown in the "PlastiDuk" product brochure of Plasti-Products, Klamath Falls, Oreg. This device is described as "soft and pliable, yet tough and durable, made from non-toxic vinyl plastic. The exact likeness of a dead drake greenhead mallard floating on the pond".

A number of drawbacks are associated with commercially available dummies, including the fact that most of them tend to wear out quickly in the course of repeated use. Also, they tend to provide an appearance and/or texture that is not life-like. Also, commercially available devices do not appear to be designed or intended to be useful for training the dogs to grasp the dummy in a particular manner or location on the dummy.

Although the devices presently available have some utility, as with any training exercise or device, it is clear that the techniques and skills associated with training dogs could be significantly improved with the availability of improved training devices.

SUMMARY OF THE INVENTION

Figure 1:
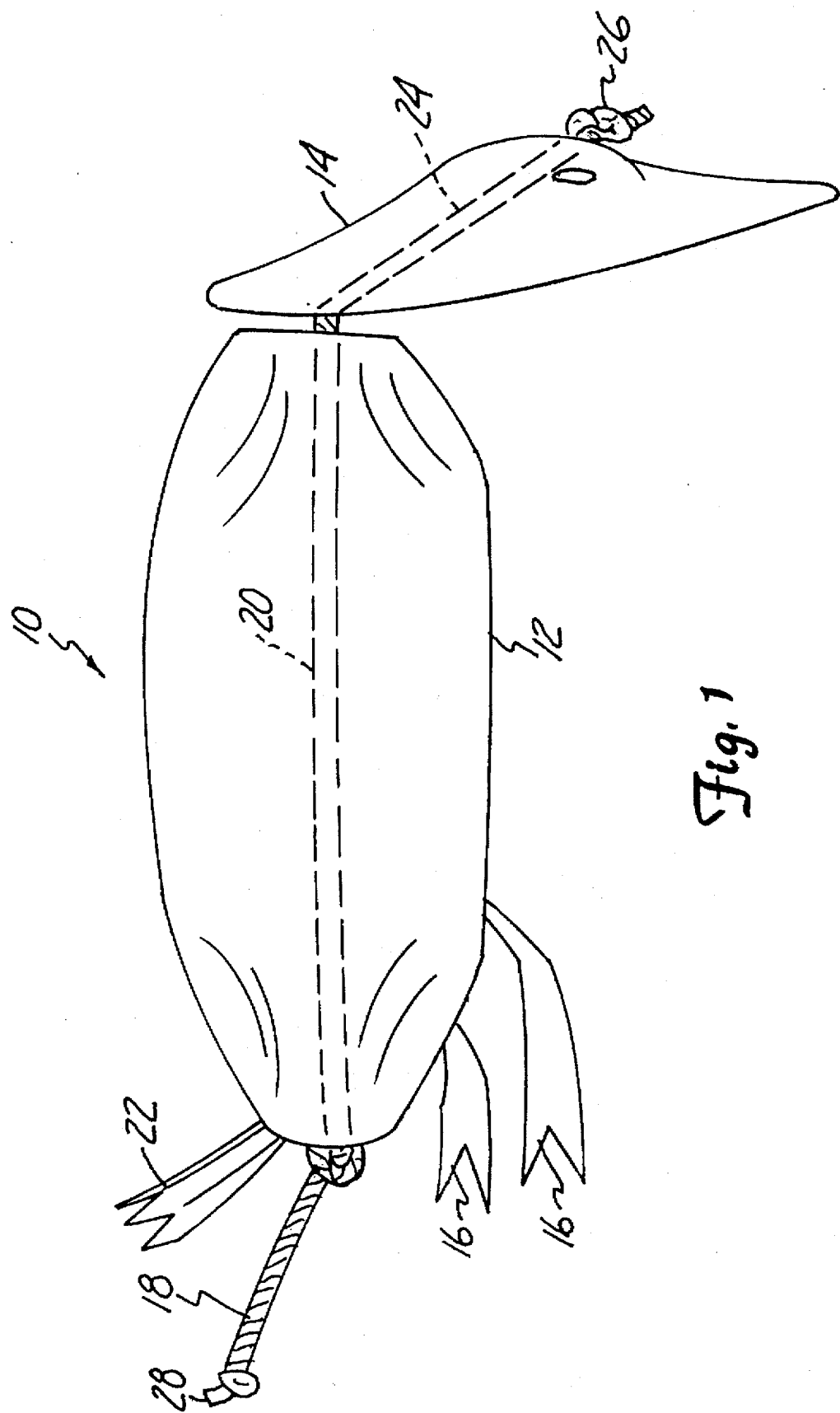
FIG. 1 is a side perspective view of an assembled and ready-to-use device in accordance with a preferred embodiment of the present invention.

In a preferred embodiment, the present invention provides a device for training dogs, the device being provided in the form of a retrieving dummy having a life-like appearance and texture. In addition to being anatomically accurate, the device of the present invention is durable in the course of repeated, rigorous, and demanding use. Moreover, the device is configured to encourage and train the dog to grasp the device in the proper manner, i.e., by the body portion and away from the head, feet or tail of the bird.

The body portion is preferably constructed of a suitable cellular foamed plastic material that is resistant to the repeated stresses, punctures, and other penetrations caused by dog's teeth. After an dog releases its grip on the dummy, the holes where the teeth had penetrated tend to close themselves (i.e., heal) within a short period of time, generally within about an hour or so, leaving at most a slightly noticeable scar but not appreciably weakening the dummy. It is this healing effect that gives the foamed plastic its self-healing designation. Surprisingly, however, the dummy is also surprisingly strong and rigid, and durable in repeated use.

In a preferred embodiment a device of the present invention comprises a retrieving dummy comprising:

(a) a unitary body portion formed of a durable, self-healing material and having a head region and an opposite tail region, the body portion having a conduit traversing a generally central longitudinal axis, the length and circumference of the body portion being dimensioned to be releasably grasped within the mouth of a retrieving dog, (b) a rigid head portion attached to the body portion and configured to provide the appearance of a drooped waterfowl head, and optionally, (c) feet or tail portions attached to the body portion and configured to deter the dog from grasping the device at or near the tail region of the body portion.

The dummy is preferably provided in the form of a three-dimensional, durable, life-like, waterproof, buoyant, and reusable device. In a preferred embodiment the device further comprises a rope traversing the central conduit, the rope being of sufficient length to exit the conduit at the head region and serve as head attachment means, and to exit the conduit at the tail region and serve as handle means of sufficient dimension to be grasped by a trainer in order to toss the device.

In the case of a throwing dummy, the rope can be grasped at the tail region and used by the trainer to throw the device. In the case of a "bumper" dummy, i.e., a dummy to be ejected or thrown from a gun or hand-held throwing device, the handle means can be omitted.

The device, and in particular the body, head and leg portions are each configured in a manner that deters the dog from biting the tail or head regions, and in turn, that encourages and trains the dog to grasp the downed waterfowl correctly, i.e., by its torso.

In yet a further preferred embodiment the body portion is formed of a durable, moldable foamed polyurethane material having an integral skin system that withstands the rigors of repeated use, yet can be used to provide the device with a realistic and lifelike texture and dimensions.

DETAILED DESCRIPTION

In a preferred embodiment, the present invention provides a three-dimensional, durable, life-like, waterproof, buoyant and reusable retrieving dummy. Such a preferred device of the present invention will be further described with reference to the Drawing, wherein FIG. 1 is a perspective view of an assembled and ready-to-use device in the form of a throwing dummy.

Figure 2:
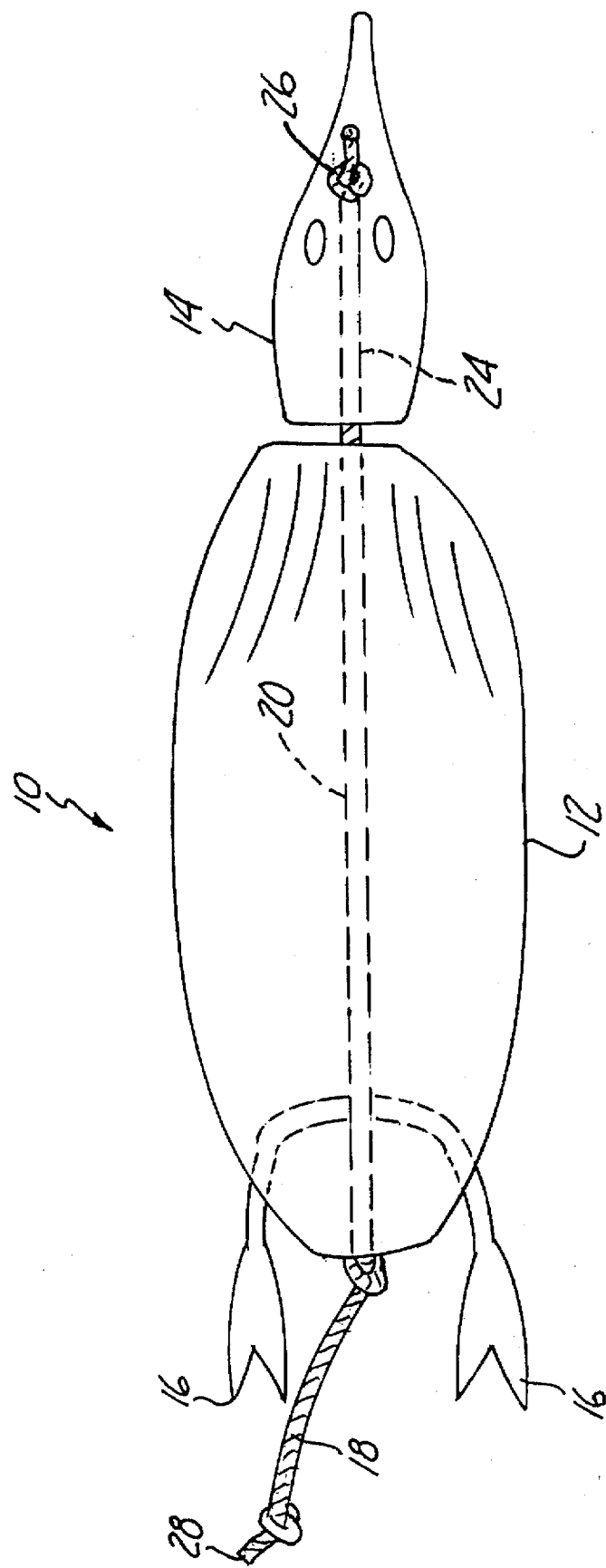
FIG. 2 is a top perspective view of the device in FIG. 1, shown without the tail portion.
Figure 3:
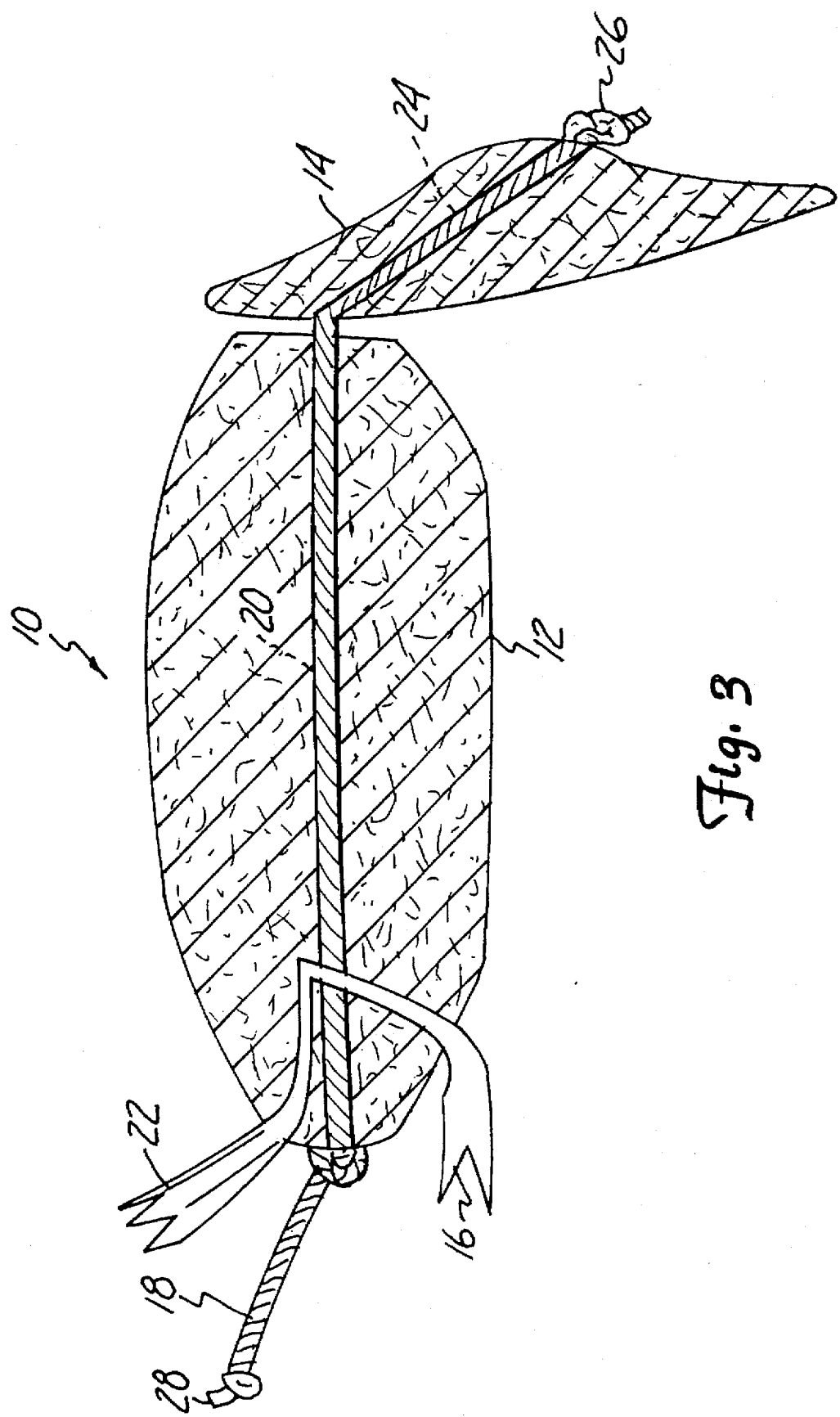
FIG. 3 shows a longitudinal cross-sectional view of the device shown in FIG. 1.

In FIG. 1, device 10 is shown comprising a body portion 12, a head 14, a pair of legs 16, and central rope 18 traversing conduit 20. FIG. 2 is a top perspective view of the device in FIG. 1, and FIG. 3 shows a longitudinal cross-sectional view of the device of FIG. 1 in order to show details associated with the central conduit and attachment of component parts.

It can be seen that the body portion is provided with a central conduit 20 traversing the longitudinal central axis of the generally oval body portion. Rope portion 18 is positioned through the central conduit in order to provide a number of functions, including a means for head attachment, and a means for grasping and/or throwing the device. Optionally included in the device, and shown in FIG. 1, is a life-like tail portion 22.

The body portion 12 of the device is preferably unitary, i.e., either formed of or formed into a material that remains substantially intact in the course of repeated use. Such material is also durable in that it is able to withstand the rigors of being repeatedly thrown and retrieved. A device of the present invention can typically be used repeatedly, for field training sessions that involve several dogs and/or several dozen, if not scores of retrievals, without exhibiting wear or tear that would render it no longer useful. After it begins to show wear, the device can optionally be disassembled in order to replace the worn body portion and be reintroduced into use.

Materials used to form the body portion are also preferably "self-healing", in that they can be repeatedly penetrated by the teeth of several dogs, and upon release can substantially close the sites of penetration, or otherwise remain structurally intact. Examples of preferred materials include, but are not limited to foamed plastics, and in particular, flexible foamed cellular polymers. Suitable foams have been used in constructing such things as dart boards and archery targets and are described, for instance in U.S. Pat. Nos. 4,066,261 (Stewart); 4,239,236; 4,244,583; and 5,368,307 (Hotchkiss).

In addition to being durable and self-healing, suitable materials for forming the body portion also provide an optimal combination of such physico-chemical properties as density, cell structure, cell size and geometry, the fraction of open cells and gas composition. In use, the materials preferably also provide an optimal combination of such properties as weight, moldability, waterproof, rigidity and flexibility, cost, nontoxicity, tear and impact resistance, water proof, buoyancy, and the ability to be painted.

Examples of suitable materials include, for instance, foamed plastic materials such as foamed polyethylenes, polystyrenes, and polyurethanes. Such materials are commercially available from a number of sources and include, for instance, an expanded polyethylene manufactured under the ETHAFOAM™ brand by the Dow Chemical Company. This is a tough, flexible and resilient closed cell foam material which can be cut, shaped or molded into the desired configuration.

Another such material is the STYROFOAM™ brand of expanded polystyrene manufactured by Dow Chemical Company. This material is an extruded multi-cellular polystyrene foam obtainable in solid semi-rigid billets, boards and other commercial shapes.

Preferred materials for use in constructing the body portion are typically cellular foams, and preferably self-healing, semi-rigid or flexible cellular foams. Suitable foams can be prepared from a variety of materials, and preferably include the use of "cast (polyurethane) elastomers" to form polyurethane foams as described, for instance, in "Polyurethanes", pages 890–897 in *Concise Encyclopedia of Polymer Science and Engineering*, J. Kroschwitz, ed., John Wiley & Sons, 1990.

In a preferred embodiment, the body material is formed using a flexible, cellular polyurethane foam system such those available under the "IS" (for "integral skin") series of Isofoam brand foams from IPI (a Division of PMC, Inc., Sun Valley, Calif.). By "integral skin" it is meant that the foam is "self skinning", that is, it forms its own skin as it expands and contacts a mold. Such foams are commonly described as useful in the automotive, leisure, and furniture industries, for instance for making headrests and arm rests.

An example of a preferred material for use in making the body portion is the polyurethane system identified as IPI Product IS-1324. This product is described as a water blown integral skin formulation, used to produce a foam having a tough skin from about 15 pounds/square foot. Such foams preferably provide a molded density of at least about 20 pcf and a core density of at least about 15 pcf (pounds/cubic foot). They further provide a tensile strength of at least about 170 psi for the formed skin and about 90 psi (pounds/square inch) for the core; and elongation strength of at least about 150% for the skin and for the core; and a tear strength of at least about 20 pli (pounds/linear inch) for the skin and 15 pli for the core.

Although such foams are not generally considered to provide the same extent of self-healing as foams used to prepare targets and the like, these self-skinning foams surprisingly provide an optimal combination of properties for use in the present invention.

The head portion 14 of a device of the present invention is preferably constructed of a durable material, and positioned on the body portion to provide the drooped appearance of a downed waterfowl. The head portion is attached to the body portion, for instance by passing rope 18 through a conduit 24 in the head, in order to tie it off in a terminal knot 26. The head is preferably configured to provide the appearance of a drooped waterfowl head, and attached to the body portion in a manner that allows the head to rotate freely in an axis about the central axis of the body, but that nevertheless retains the head in fairly tightly and close proximity to the body portion.

The head portion 14 of the present invention is preferably formed of a rigid polymeric material. Use of a rigid material better ensures that the dog will not grasp the dummy by its head region. Rigid polyurethanes and other such materials are particularly useful and within the skill of those in the art. A preferred rigid polyurethane for forming the head is available as Catalog No. 2016-38, Premium Polymers, Austin, Tex.

The feet and tail portions are configured, again, to provide a life-like appearance and deter the dog from grasping the in the tail region. The feet and tail portions can be attached within recesses formed within the body portion and configured to deter the dog from grasping the device at or near the tail region of the body portion. An example of a preferred material for making the feet and legs is the product identified as "E-1048", available from IPI. The material can be colored at the time of preparation and use, e.g., in order to provide feet that have a realistic orange color.

In a preferred embodiment the device further comprises a rope traversing the central conduit and having sufficient length to exit the conduit at the head region and serve as head attachment means, and to exit the conduit at the tail region and serve as handle means capable of being grasped by a trainer in order to toss the device. Suitable ropes can be provided of strong and durable natural or synthetic materials, e.g., polymeric materials such as nylon. The rope can be provided in any suitable color, e.g., natural colors, blaze orange or another color that allows it to either be hidden or seen more readily in the field.

Devices of the present invention can be made using techniques and tools well within the skill of those in the art, given the present description. In a preferred embodiment, a reusable, permanent body portion mold is first formed, e.g., by carving a suitable material. The mold is designed for repeated use, and used to retain and form the blend of materials used to form the foamed cellular material. The mold is used to form a body portion in a generally oval, life-like shape and dimensions. Suitable body portion typically has an overall length of approximately 8 to 10 inches, and a diameter at its widest point of approximately 3 to 5 inches. The body portion can be tapered as it approaches each end, with optionally truncated ends.

Figure 4:
FIG. 4 is a perspective view of the device of FIG. 1 being grasped within the mouth of a retrieving dog.

Once the mold has been created, and in the course of producing devices, the feet portions 16 and tail portion 22 are preferably first produced. The feet and tail can be placed in the mold and the body portion cast around them to secure them in position. Optionally, and as shown in FIG. 4, they can be constructed in such a manner that they are attached to one another, in order to improve the ability to anchor them in the body.

Also, the head portion 14 is separately formed, preferably including the rope either cast or glued within it at the time. Either a central conduit is formed in the cast body portion, or preferably the body is itself cast in a manner that provides a central conduit as it forms around the rope. A rope of suitable length and dimensions, and previously cast or glued into the head, can then be passed through the body portion conduit and tied off at the tail end to form knot 28. In an alternative embodiment, in which the device will be used as a bumper dummy, rather than throwing dummy, there will be no handle and little if any rope exposed at the tail end.

Using the preferred construction materials, the device will typically be made in a two-step process of first constructing the individual components, and second, assembling them into the final device. The various components can be colored, e.g., painted, or otherwise decorated, either at the time they are formed or after they have been assembled to form a device of the invention.

Also disclosed is a method of training a dog comprising the steps of (a) providing a training device as described herein, and (b) throwing the device to a distant location to be retrieved by the dog. Those skilled in the art of training retrieving dogs will, given the present description, appreciate the manner in which devices of the present invention can be used. In a preferred embodiment, the device is generally thrown a sufficient distance from the dog to be trained, preferably onto the surface of a body of water. Generally, the device will be tossed or thrown by the trainer, and the dog provided with a signal to begin to retrieve the dummy. The dog will retrieve the dummy, grasping it in the proper location and manner, and return it to the trainer.

FIG. 4 is a perspective view of the device of FIG. 1 being grasped within the mouth of a retrieving dog. It can be seen that the device is dimensioned to be comfortably held in the dog's mouth, in a manner that substantially prevents the dog from holding it in any other, inappropriate manner.

While the preferred embodiment of the invention has been described in detail, it is apparent that various changes and modifications may be made to the overall arrangement without departing from the spirit and scope of the invention. Accordingly, the true scope of the invention is to be determined from the accompanying claims.

What is claimed is:

1. A device for training retrieving dogs, the device comprising:
    (a) a unitary body portion formed of a durable, self-healing material and having a head region and an opposite, tail region, the body portion comprising a conduit traversing a generally central longitudinal axis, the length and circumference of the body portion being dimensioned to be releasably grasped within the mouth of a retrieving dog;
    (b) a rigid head portion made of a different material than said body portion and attached to the head region of the body portion and configured to provide the appearance of a waterfowl head and to discourage a dog from biting said rigid head portion, and optionally;
    (c) feet and tail portions attached to the tail region of the body portion and configured to deter the dog from grasping the device at or near the tail region of the body portion.

2. A device according to claim 1 further comprising a rope traversing the central conduit, the rope being of sufficient length to exit the conduit at the head region and serve as head attachment means, and to exit the conduit at the tail region and serve as handle means.

3. A device according to claim 1 wherein the body portion is formed of a durable, moldable foamed polyurethane material.

4. A device according to claim 3 wherein the polyurethane material provides an integral skin system.

5. A method of training a dog comprising the steps of:
    (a) providing a training device comprising
        (i) a unitary body portion formed of a durable, self-healing material and having a head region and an opposite tail region, the body portion having a conduit traversing a generally central longitudinal axis, the length and circumference of the body portion being dimensioned to be releasably grasped within the mouth of a retrieving dog;
        (ii) a rigid head portion made of a different material than said body portion and attached to the head region of the body portion and configured to provide the appearance of a waterfowl head and to discourage a dog from biting said rigid head portion, and;
        (iii) feet and tail portions attached to the tail region of the body portion and configured to deter the dog from grasping the device at or near the tail region of the body portion; and
    (b) throwing the device to be retrieved by the dog.

6. A method according to claim 5 further wherein the device further comprises a rope traversing the central conduit, the rope being of sufficient length to exit the conduit at the head region and serve as head attachment means, and to exit the conduit at the tail region and serve as handle means.

7. A method according to claim 5 wherein the body portion is formed of a durable, moldable foamed polyurethane material.

8. A method according to claim 7 wherein the polyurethane material provides an integral skin system.

9. A method of making a device for training retrieving dogs comprising the steps of:

(a) providing a unitary body portion formed of a durable, self-healing material and having a head region and an opposite tail region, the body portion having a conduit traversing a generally central longitudinal axis, the length and circumference of the body portion being dimensioned to be releasably grasped within the mouth of a retrieving dog, (b) attaching a rigid head portion made of a different material than said body portion to the body portion and configured to provide the appearance of a waterfowl head and to discourage a dog from biting said rigid head portion, and, (c) attaching feet and tail portions to the body portion and configured to deter the dog from grasping the device at or near the tail region of the body portion.

10. A method according to claim 9 wherein the device further comprises a rope traversing the central conduit, the rope being of sufficient length to exit the conduit at the head region and serve as head attachment means, and to exit the conduit at the tail region and serve as handle means.

11. A method according to claim 9 wherein the body portion is formed of a durable, moldable foamed polyurethane material.

12. A method according to claim 11 wherein the polyurethane material provides an integral skin system.

* * * * *